United States Patent
Vogt et al.

(10) Patent No.: US 10,151,571 B2
(45) Date of Patent: Dec. 11, 2018

(54) POSITION MEASURING DEVICE AND METHOD FOR DETERMINING POSITIONS OF A MEASUREMENT OBJECT

(71) Applicant: Carl Zeiss SMT GmbH, Oberkochen (DE)

(72) Inventors: Peter Vogt, Heidenheim (DE); Florian Bart, Aalen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 24 days.

(21) Appl. No.: 15/608,016

(22) Filed: May 30, 2017

(65) Prior Publication Data
US 2017/0261304 A1    Sep. 14, 2017

Related U.S. Application Data

(63) Continuation of application No. PCT/EP2015/077450, filed on Nov. 24, 2015.

(30) Foreign Application Priority Data

Nov. 27, 2014 (DE) .................... 10 2014 224 221

(51) Int. Cl.
*G01R 27/26* (2006.01)
*G01B 7/00* (2006.01)
(Continued)

(52) U.S. Cl.
CPC ............. *G01B 7/003* (2013.01); *G01B 7/023* (2013.01); *G01B 7/082* (2013.01); *G01B 7/14* (2013.01)

(58) Field of Classification Search
USPC .................................................. 324/660–663
See application file for complete search history.

(56) References Cited

U.S. PATENT DOCUMENTS 6,388,452 B1    5/2002  Picciotto
6,639,225 B2   10/2003  Ulf-Carsten et al.
(Continued)

FOREIGN PATENT DOCUMENTS

DE        4024052 A1      1/1992
DE       10006534 A1     10/2001
(Continued)

OTHER PUBLICATIONS

International Search Report and Written Opinion in counterpart International Application No. PCT/EP2015/077450, dated Jan. 22, 2017, 13 pages, with partial translation, 3 pages.
(Continued)

*Primary Examiner* — Vincent Q Nguyen
(74) *Attorney, Agent, or Firm* — Edell, Shapiro & Finnan, LLC

(57) ABSTRACT

In a position measuring device (5) and a method for ascertaining positions of an object (3) to be measured, at least one capacitive position measuring sensor (7) provides a position measurement signal ($P_M$) relating to the object (3) to be measured and at least one capacitive reference measurement sensor (14) provides a reference measurement signal ($R_M$). The measuring sensors (7, 14) are connected to a computing unit (8) which is embodied to calculate a position signal (P) to ascertain the positions from the position measurement signal ($P_M$) and the reference measurement signal ($R_M$). As a result of interfering influences being contained substantially equally in the position measurement signal ($P_M$) and the reference measurement signal ($R_M$) as an interference signal (S), it is possible to determine and eliminate the interference signal (S) during the calculation.

18 Claims, 9 Drawing Sheets

(51) Int. Cl.
   *G01B 7/02*   (2006.01)
   *G01B 7/06*   (2006.01)
   *G01B 7/14*   (2006.01)

(56) References Cited

U.S. PATENT DOCUMENTS

| | | |
|---|---|---|
| 8,659,407 B2 | 2/2014 | Rudolf et al. |
| 2008/0239494 A1 | 10/2008 | Dennis et al. |
| 2009/0015268 A1 | 1/2009 | Delrae et al. |

FOREIGN PATENT DOCUMENTS

| | | |
|---|---|---|
| DE | 10142489 A1 | 4/2002 |
| JP | 2000082244 A | 3/2000 |
| WO | 2007022326 A2 | 2/2007 |
| WO | 2009011781 A1 | 1/2009 |
| WO | 2009047073 A1 | 4/2009 |

OTHER PUBLICATIONS

Office Action in corresponding German Application 102014224221. 5, dated Sep. 18, 2015, along with English Translation.

POSITION MEASURING DEVICE AND METHOD FOR DETERMINING POSITIONS OF A MEASUREMENT OBJECT

CROSS-REFERENCE TO RELATED APPLICATIONS

This is a Continuation of International Application PCT/EP2015/077450, which has an international filing date of Nov. 24, 2015, and the disclosure of which is incorporated in its entirety into the present Continuation by reference. The following disclosure is also based on and claims the benefit of and priority under 35 U.S.C. § 119(a) to German Patent Application No. DE 10 2014 224 221.5, filed Nov. 27, 2014, which is also incorporated in its entirety into the present Continuation by reference.

FIELD OF THE INVENTION

The invention relates to a position measuring device and a method for ascertaining positions of an object to be measured.

Capacitive measuring sensors for ascertaining the position of objects to be measured are known. There is a continuing need for increasing the measurement accuracy of position measurements performed with capacitive measuring sensors.

BACKGROUND

One object of the invention is to develop a position measuring device for ascertaining positions of an object to be measured, which facilitates a high accuracy when ascertaining the position in a simple manner.

SUMMARY

This and further objects are addressed with position measuring as described and claimed below. According to one aspect of the invention, it was identified that increasing miniaturization, i.e. the reduction in size, of the capacitive measuring sensors also leads to a reduction of the capacitance thereof, as a result of which interfering influences are included more strongly in the position measurement signal. As a result of the position measuring device comprising at least one capacitive reference measuring sensor in addition to the at least one capacitive position measuring sensor, it is possible to identify and eliminate interfering influences by evaluating the position measurement signal and the reference measurement signal using a computing unit. Hence, the computing unit calculates a position signal largely freed from interfering influences from the position measurement signal and the associated reference measurement signal. The position signal has a significantly higher accuracy than the position measurement signal afflicted by interfering influences. In particular, the position measurement signal is composed of the position signal to be calculated and an interference signal, whereas the reference measurement signal is composed of a predefined reference signal and the interference signal. By way of example, the interference signal may be ascertained from the reference measurement signal by subtracting the reference signal, the interference signal in turn being able to be subtracted from the position measurement signal for the purposes of ascertaining the position signal. As a result of this calculation, the position measurement signal is freed from the interference signal, and so the position of the object to be measured can be established extremely accurately from the position signal.

As a result of the carrier body consisting of a material having an extremely low coefficient of thermal expansion, there is substantially no change in the reference distance, and hence in the reference signal, as a consequence of temperature changes. As a result, the reference measuring sensor has a high drift stability, as a result of which an extremely constant reference signal is producible. In particular, the material is a glass-ceramic material. By way of example, glass-ceramic materials with a low coefficient of thermal expansion are known by the trademarks ZERODUR or ULE. As a result of this, the position measuring device ensures a high accuracy when ascertaining the position.

As a result of the signal lines forming a signal cable over substantially the entire length thereof, it is possible to shield the signal lines together against interfering influences on the one hand and, on the other hand, interfering influences are included to an equal extent in the position measurement signal and the reference measurement signal such that the interference signal resulting from the interfering influences may be largely eliminated from the position measurement signal. As a result of this, it is possible to eliminate changes in the capacitance of the signal cable in particular, which changes are caused, for example, by kinking.

A position measuring device as claimed in claim 2 ensures a high accuracy when ascertaining the position.

A position measuring device as claimed in claim 3 ensures a high accuracy when ascertaining the position if the position measuring device comprises a plurality of position measuring sensors. As a result of a dedicated reference measuring sensor being assigned to each position measuring sensor, the former may be arranged in an ideal manner in relation to the position measuring sensor, and so the interfering influences are detected to the same extent by the position measuring sensor and the reference measuring sensor. The respective position measuring sensor and the associated reference measuring sensor may comprise a common measuring sensor housing or two separate measuring sensor housings.

A position measuring device as claimed in claim 4 ensures a high accuracy when ascertaining the position in conjunction with a comparatively low construction outlay. As a result of a plurality of position measuring sensors being assigned to one reference measuring sensor, the associated reference measuring sensor may be used for correcting all position measurement signals. Hence, position signals for all position measuring sensors assigned to the reference measuring sensor are calculated from the position measurement signals and the reference measurement signal. As a result of this, the number of reference measuring sensors is optimized.

A position measuring device as claimed in claim 5 ensures a high accuracy when ascertaining the position. As a result of the at least one reference measuring sensor being arranged at a small distance from the associated at least one position measuring sensor, interfering influences are detected to an equal extent by the at least one reference measuring sensor and the associated at least one position measuring sensor, and so the interference signal resulting from the interfering influences may be largely eliminated during the subsequent calculation of the associated position signal.

A position measuring device as claimed in claim 6 ensures the provision of the reference measurement signal in a simple manner. The at least one reference measuring sensor comprises a first reference electrode and an associated second reference electrode, wherein the second reference electrode may be embodied as a reference measuring surface. The reference electrodes are arranged on the carrier body at a predefined reference distance from one another. The reference distance is substantially non-changeable. Here, substantially means that a change in the reference distance only takes place as a consequence of interfering or environmental influences, such as e.g. changes in the ambient conditions. Therefore, the reference distance defines a substantially constant reference signal. By way of example, the reference measuring surface is embodied as a metallic coating on the carrier body. By way of example, the reference measuring surface is a layer of chromium.

A position measuring device as claimed in claim 7 ensures a high accuracy when ascertaining the position. The ratio of the mean position $D_M$ of the object to be measured to the reference distance $D_R$ ensures that the reference distance $D_R$ substantially corresponds to the mean position $D_M$ of the object to be measured. As a result of this, interfering influences are included substantially to an equal extent in the position measurement signal and the associated reference measurement signal, and so the interference signal resulting from the interfering influences is largely eliminable.

A position measuring device as claimed in claim 8 ensures a high accuracy when ascertaining the position.

A position measuring device as claimed in claim 9 ensures a high accuracy when ascertaining the position. As a result of the reference electrodes being arranged on opposite inner sides of the carrier body, the ambient medium, such as the air, acts in accordance with the position measuring sensor as a dielectric. As a result of this, it is possible to detect interference influences as a consequence of the ambient conditions, such as e.g. the humidity, the air pressure or the temperature, in the reference measurement signal and subsequently eliminate these from the position measurement signal.

A position measuring device as claimed in claim 10 ensures a high accuracy when ascertaining the position. The carrier body forms the dielectric as a result of the carrier body being arranged between the reference electrodes. Here, the carrier body is formed, in particular, from a material with a low coefficient of thermal expansion, such as e.g. a glass-ceramic material. Ambient conditions are barely included in the reference measurement signal as a result of the carrier body forming the dielectric, and so a constant reference signal is provided. As a result of this, it is possible, in particular, to compensate interfering influences as a consequence of the signal cable and/or the measurement electronics.

A position measuring device as claimed in claim 11 ensures a simple and space-saving design.

A position measuring device as claimed in claim 12 ensures a high accuracy when ascertaining the position. The reference measuring sensor is arranged in such a way that it serves as a second position measuring sensor. Here, the reference measuring sensor is arranged opposite the position measuring sensor in particular, and so the position measurement signal and the reference measurement signal ideally, i.e. without interfering influences, result in a constant measurement signal upon addition. By way of example, if the position measuring sensor and the reference measuring sensor are arranged at equal distances from a central position of the object to be measured, the associated position signal emerges by forming an average of the reference measurement signal added to the position measurement signal if no interference influences are present. Proceeding herefrom, interference signals as a consequence of interfering influences may be identified in the position measurement signal and the reference measurement signal or the sum thereof, and said interference signals may be eliminated.

A position measuring device as claimed in claim 13 improves the signal-to-noise ratio and, as a result thereof, ensures a high accuracy when ascertaining the position. The original measurement signal is already amplified prior to the transmission to the computing unit or measurement electronics as a result of a transistor being integrated into the measuring sensor housing. If the amplified measurement signal is transmitted to the computing unit or the measurement electronics in the case of an unchanging interference input or interference signal as a consequence of interfering influences, there is an increase in the signal-to-noise ratio, as a result of which a higher accuracy is obtainable when ascertaining the position. By way of example, the at least one capacitive position measuring sensor and/or the at least one capacitive reference measuring sensor are embodied with an integrated transistor. In particular, the integrated transistor is embodied as a field effect transistor.

A position measuring device as claimed in claim 14 ensures a calculation of the position signal in a simple manner. As a result of the at least one position measuring sensor and the respectively associated reference measuring sensor being of equal construction, the measuring sensors, in principle, have a corresponding measurement characteristic, and so no measurement inaccuracies may occur as a consequence of a different configuration of the measuring sensors. As a result of this, a high accuracy is ensured when ascertaining the position, without this requiring complicated additional measures for compensating different measurement characteristics.

A further object of the invention is to develop a positioning appliance which facilitates a high accuracy when positioning an object to be measured. In particular, the positioning accuracy should lie in the nanometer range or in the sub-nanometer range.

This further object is addressed by a positioning appliance as claimed. Position measuring devices according to the invention facilitate ascertaining the position of the object to be measured so exactly that the object to be measured can be positioned with the desired accuracy. To this end, in particular, the positioning appliance forms a positioning control loop such that a desired intended position of the object to be measured is exactly adjustable on the basis of the calculated position signal. The further advantages of the positioning appliance correspond to the advantages of the position measuring device which have already been described.

A positioning appliance as claimed in claim 16 ensures a high accuracy when positioning the object to be measured.

A projection exposure apparatus constitutes an advantageous application of the positioning appliance according to the invention and of the position measuring device according to the invention.

The invention is further based on the object of developing a method for ascertaining positions of an object to be measured, which facilitates a high accuracy when ascertaining the position in a simple manner.

According to yet another formulation, the invention is addressed with a method. The advantages of the method according to the invention correspond to the advantages of the position measuring device and positioning appliance according to the invention which have already been described. The method according to the invention may also be developed, in particular, with the features of claims 1 to 17.

BRIEF DESCRIPTION OF THE DRAWINGS

Further features, advantages and details of the invention emerge from the following description of a plurality of exemplary embodiments. In the figures.

DETAILED DESCRIPTION

Figure 1:
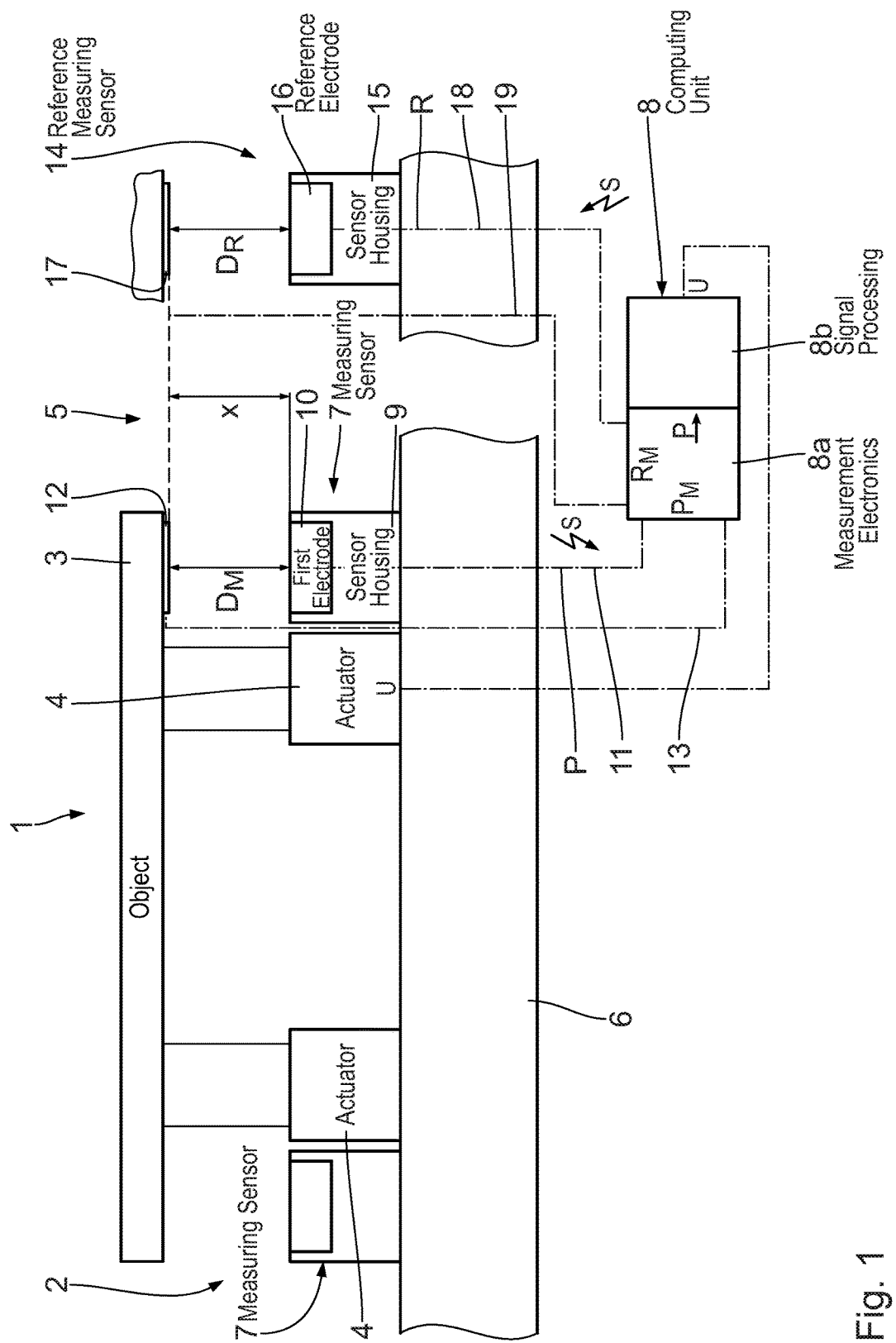
FIG. 1 shows a schematic illustration of a positioning appliance comprising an object to be measured, which is to be positioned, and a position measuring device for ascertaining the position of the object to be measured, which are part of a projection exposure apparatus not depicted in any more detail.

A projection exposure apparatus 1 (not depicted in any more detail) comprises a positioning appliance 2, which comprises an object 3 to be measured, which is to be positioned, at least one actuator 4, and at least one position measuring device 5. Two actuators 4 are depicted in FIG. 1 in an exemplary manner. The actuators 4 are arranged on a base plate 6 and serve to displace the object 3 to be measured relative to the base plate 6. By way of example, the object 3 to be measured is—as depicted in FIG. 1—a plate which needs to be positioned exactly in the nanometer range, in particular in the sub-nanometer range, for the function of the projection exposure apparatus, for example by way of a linear displacement and/or a tilt and/or a deformation.

For the purposes of ascertaining a position x of the object 3 to be measured, the position measuring device 5 comprises at least one capacitive position measuring sensor 7 which provides to a computing unit 8 a position measurement signal $P_M$ relating to the object 3 to be measured. In the positioning appliance 2 depicted in FIG. 1, a capacitive position measuring sensor 7 is assigned to each actuator 4, said position measuring sensor serving to ascertain a respective position x of the object 3 to be measured. The computing unit 8 comprises measurement electronics 8a and signal processing 8b, which are described in detail below.

The capacitive position measuring sensors 7 have an embodiment of equal construction, and so only one of the capacitive position measuring sensors 7 is described below. The position measuring sensor 7 comprises a measuring sensor housing 9, in which a first electrode 10 is arranged at least in part. The first electrode 10 is connected to the computing unit 8 by way of a signal line 11. A second electrode 12 belonging to the position measuring sensor 7 is embodied as a measuring surface on the object 3 to be measured. To this end, the object 3 to be measured is provided with a coating opposite to the first electrode 10, with the coating acting as the second electrode 12 or measuring surface. The second electrode 12 is connected to the computing unit 8 by way of a signal line 13.

The measurement principle of the capacitive position measuring sensor 7 is known in principle. The capacitive position measuring sensor 7 acts approximately like a plate capacitor, the capacitance C of which depends on the distance or the position x of the electrodes 10 and 12. Accordingly, the capacitive position measuring sensor 7 provides the position measurement signal $P_M$, which characterizes the position x of the object 3 to be measured, to the computing unit 8. Here, the position measurement signal $P_M$ is composed of a used signal, or the actual position signal P, and an interference signal S which, as a consequence of interfering influences, is superposed on the position signal P. This is exemplified schematically in FIG. 1.

The position measuring device 5 further comprises at least one capacitive reference measuring sensor 14, which provides a reference measurement signal $R_M$ to the computing unit 8. The reference measurement signal $R_M$ provided to the computing unit 8 by the reference measuring sensor 14 in turn is composed of a used signal, or a reference signal R, and, as a consequence of interfering influences, a superposed interference signal S. This is indicated schematically in FIG. 1.

Depending on the requirements placed on the positioning appliance 2, a dedicated reference measuring sensor 14 may be assigned to each position measuring sensor 7 or a common reference measuring sensor 14 may be assigned to a plurality of position measuring sensors 7. The computing unit 8 is used to calculate a position signal P for each position measuring sensor 7 from the reference measurement signal $R_M$ and the respective position measurement signal $P_M$.

The reference measuring sensors 14 have an embodiment of equal construction and, in particular, also have an embodiment with the same construction as the associated position measuring sensors 7, and so only one of the reference measuring sensors 14 is described below. The capacitive reference measuring sensor 14 comprises a measuring sensor housing 15, in which a first electrode or reference electrode 16 is arranged at least in part. A second electrode or reference electrode 17 belonging to the reference measuring sensor 14 is embodied as a measuring surface or reference measuring surface and arranged opposite to the first reference electrode 16. The arrangement of the reference electrode 16 and the reference measuring surface 17 is described in detail below. The first reference electrode 16 is connected to the computing unit 8 by a signal line 18. Accordingly, the second reference electrode or reference measuring surface 17 is connected to the computing unit 8 by way of a signal line 19.

For the purposes of ascertaining the position x of the object 3 to be measured, the computing unit 8 is embodied in such a way that the interference signal S is calculable from the position measurement signal $P_M$ and the associated reference measurement signal $R_M$, as well as a predefined reference signal R, in order thereby to correct the position measurement signal $P_M$ or eliminate the interference signal S contained therein. Here, correcting the position measurement signal $P_M$ is based on the assumption that the interference signal S is contained substantially to equal extents in the position measurement signal $P_M$ and the associated reference measurement signal $R_M$. This assumption applies all the more, the more closely the design, the installation conditions, and the ambient conditions of the position measuring sensor 7 and the associated reference measuring sensor 14 correspond to one another.

Figure 2:
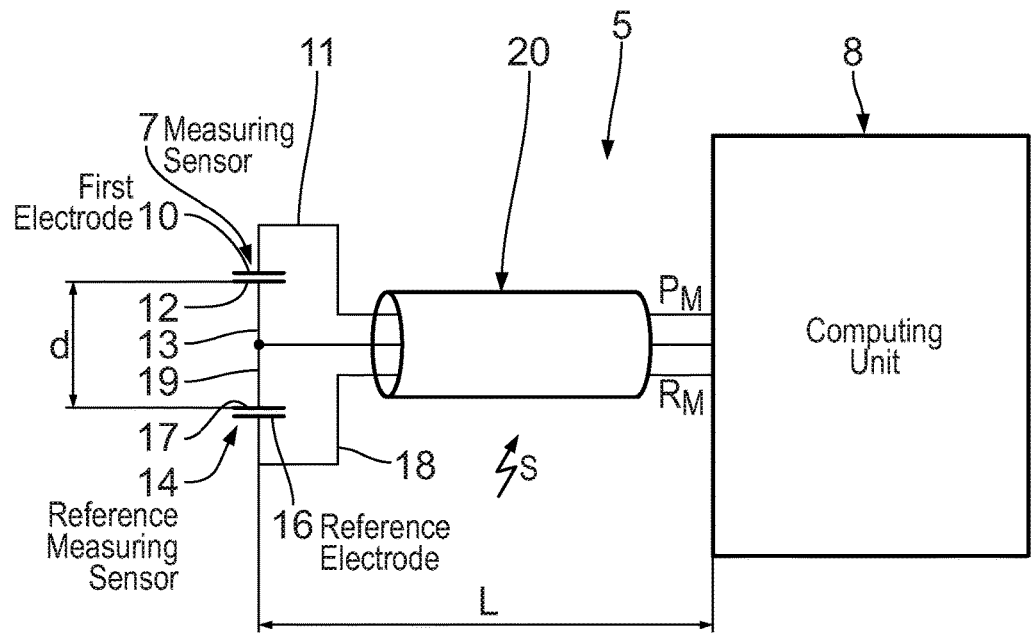
FIG. 2 shows a schematic illustration of the basic design of the position measuring device in accordance with FIG. 1, comprising at least one capacitive position measuring sensor and at least one capacitive reference measuring sensor.

To this end, the position measuring sensor 7 and the associated reference measuring sensor 14 are preferably arranged at the smallest distance d possible from one another such that the installation and/or ambient conditions largely correspond to one another. In particular, the distance d is at most 10 mm, in particular at most 8 mm, and in particular at most 6 mm. Further, the signal lines 11, 13, 18, and 19 largely form a common signal cable 20. In particular, the signal lines 11, 13, 18, and 19 form the common signal cable 20 over at least 70%, in particular over at least 80%, and in particular over at least 90% of the total length L thereof. This is exemplified in principle in FIG. 2.

The reference electrodes 16, 17 define a reference distance $D_R$ therebetween. In particular, $0.7 \leq D_M/D_R \leq 1.3$, in particular $0.8 \leq D_M/D_R \leq 1.3$, in particular $1.2 \leq D_M/D_R \leq 1.3$, and in particular $0.9 \leq D_M/D_R \leq 1.1$ applies to a ratio of a mean position $D_M$ of the object 3 to be measured to the reference distance $D_R$. This substantially ensures that the thickness of the dielectric between the reference electrodes 16, 17 substantially corresponds to the thickness of the dielectric between the electrodes 10, 12 of the position measuring sensor 7. By way of example, the reference distance $D_R$ is fixed, i.e. the reference electrodes 16, 17 are not displaceable relative to one another.

Figure 3:
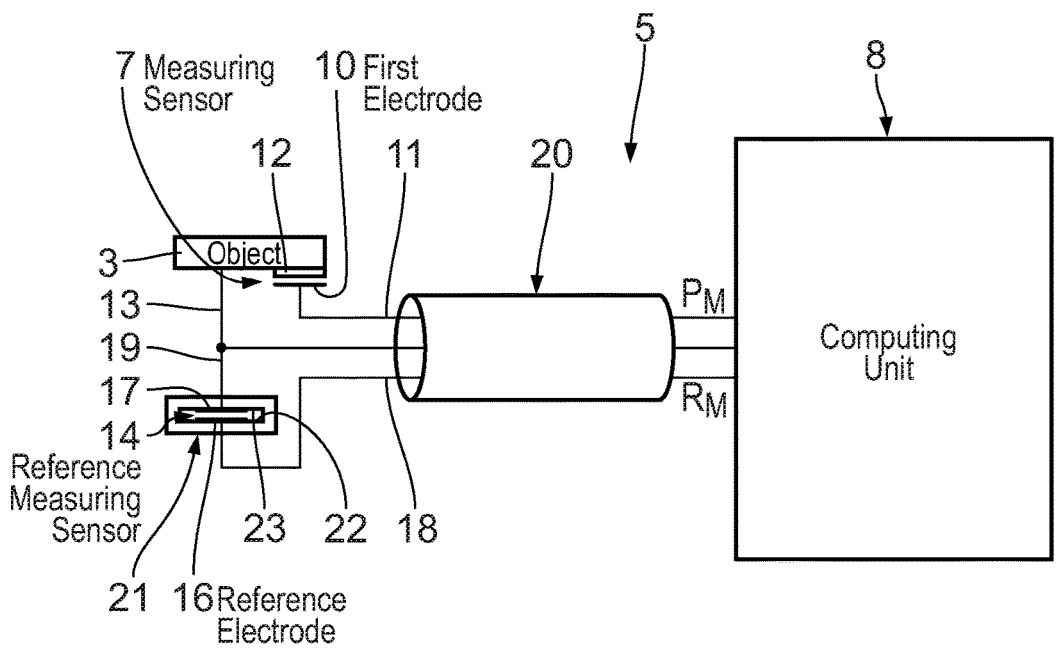
FIG. 3 shows a schematic illustration of a position measuring device in accordance with a first exemplary embodiment, in which the reference measuring sensor is arranged on a carrier body and the ambient medium forms a dielectric.

FIG. 3 shows a first exemplary embodiment of the position measuring device 5, in which the reference measuring sensor 14 is arranged on a carrier body 21. By way of example, the carrier body 21 is arranged on the base plate 6. The carrier body 21 has an embodiment with a hollow profile in cross section, with the first reference electrode 16 and the second reference electrode 17, or the reference measuring surface, being arranged on opposite the inner sides 22, 23 of the carrier body 21 such that the ambient medium is arranged between the reference electrodes 16, 17 as dielectric. The carrier body 21 preferably consists of a material which has a coefficient of thermal expansion α at a temperature of 20° C., for which $\alpha \leq 10 \cdot 10^{-8}/K$, in particular $\alpha \leq 8 \cdot 10^{-8}/K$, and in particular $\alpha \leq 6 \cdot 10^{-8}/K$ applies in terms of absolute value. In particular, the material is a glass-ceramic material. By way of example, such glass-ceramic materials are known by the trademarks ZERODUR or ULE.

By way of example, the second electrode 12 and the corresponding second reference electrode 17 are embodied as measuring surfaces, which are produced by a coating. The reference electrodes 16, 17 are not displaceable in relation to one another, and so the reference distance $D_R$ and the associated reference signal R are constant. On account of the material and embodying the carrier body 21 as a mechanical short-circuiting link, the reference measuring sensor 14 is stable against drifts and reacts only very little to changes in temperature. Since the ambient medium at the reference measuring sensor 14 and at the position measuring sensor 7 acts as a dielectric, ambient conditions, such as e.g. the humidity and/or the air pressure, may be detected as interference signal S in the position measurement signal $P_M$ and in the reference measurement signal $R_M$, and may subsequently be compensated for in the computing unit 8. Since the reference measuring sensor 14 produces a constant reference signal R, it acts as a passive sensor.

Figure 4:
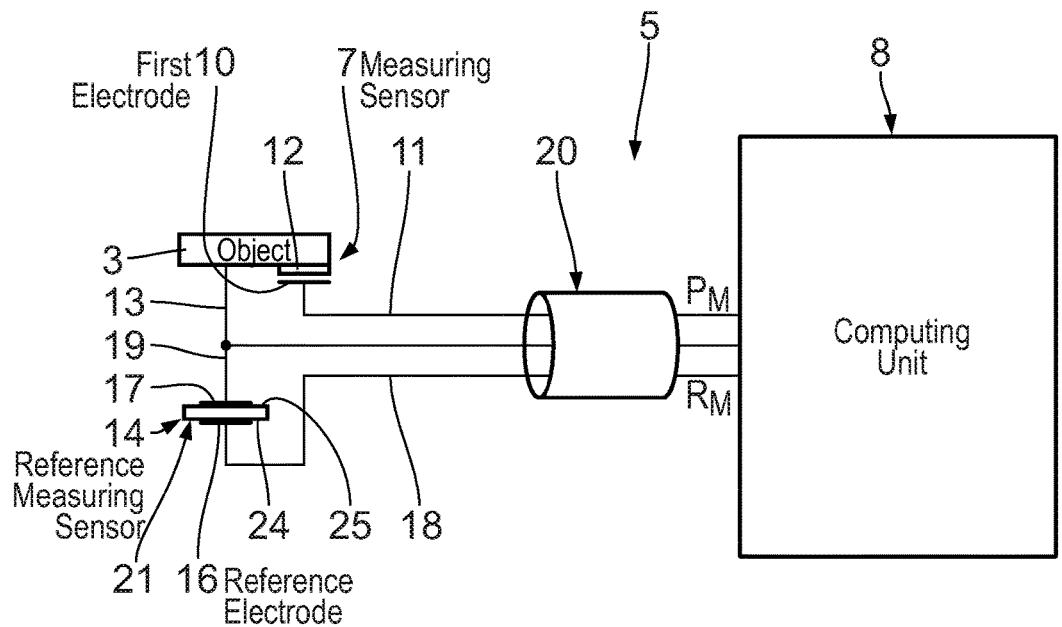
FIG. 4 shows a schematic illustration of a position measuring device in accordance with a second exemplary embodiment, in which the at least one reference measuring sensor is arranged on a carrier body and the latter forms a dielectric.

FIG. 4 shows a second exemplary embodiment of the position measuring device 5 according to the invention. In contrast to the preceding example embodiment, the carrier body 21 is embodied as a plate, the reference electrodes 16, 17 being arranged on the outer sides 24, 25 thereof. Here, the carrier body 21 forms a dielectric for the reference measuring sensor 14. In correspondence with the preceding exemplary embodiment, the carrier body 21 preferably consists of a material having a small coefficient of thermal expansion α. As a result of the reference electrodes 16, 17 not being displaceable in relation to one another and the carrier body 21 forming a dielectric, the ambient conditions are substantially not incorporated into the reference measurement signal $R_M$, and so, in particular, interfering influences as a consequence of the signal lines 11, 13, 18, 19 and of the measurement electronics 8a are detected and compensated. Reference is made to the preceding exemplary embodiment in respect of the further design and the further functionality.

Figure 5:
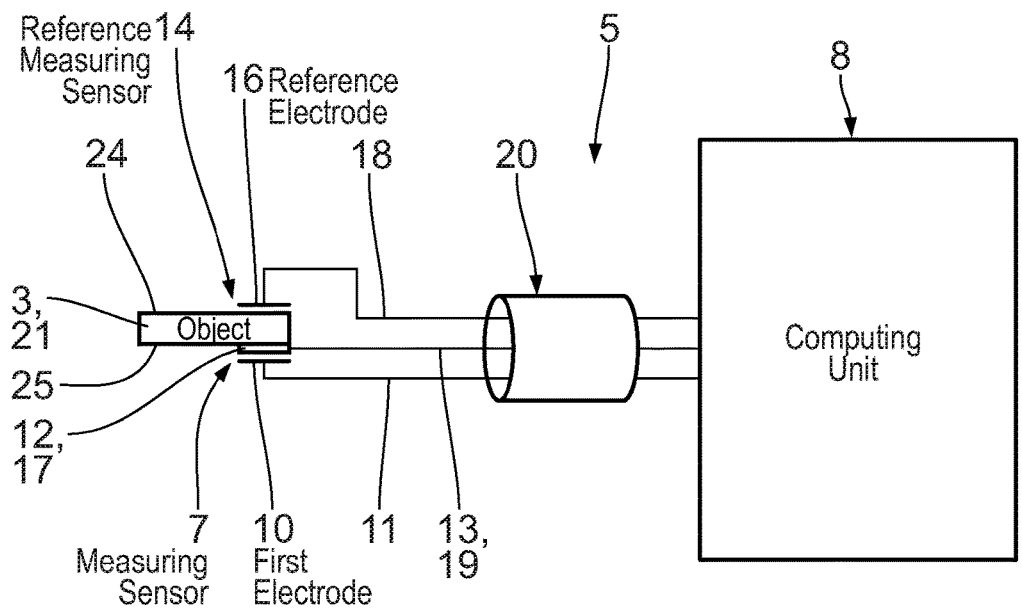
FIG. 5 shows a schematic illustration of a position measuring device in accordance with a third exemplary embodiment, in which the at least one reference measuring sensor is arranged on the object to be measured and the latter forms a dielectric.

FIG. 5 shows a third exemplary embodiment of the position measuring device 5 according to the invention, in which the object 3 to be measured forms the carrier body 21. Hence, the object 3 to be measured is arranged between the reference electrodes 16, 17 of the reference measuring sensor 14 and forms a dielectric therefor. The reference electrodes 16, 17 are arranged on the outer sides 24, 25 of the object 3 to be measured. In particular, the second reference electrode 17 is embodied as a reference measuring surface, which is produced by a coating. The reference electrode 17, or the reference measuring surface, simultaneously serves as second electrode 12, or measuring surface, for the position measuring sensor 7. The object 3 to be measured preferably consists of a material in accordance with the preceding exemplary embodiments, which has a small coefficient of thermal expansion α. The position measuring device 5 has a simple design and saves space. Reference is made to the preceding exemplary embodiments in respect of the further design and the further functionality.

Figure 6:
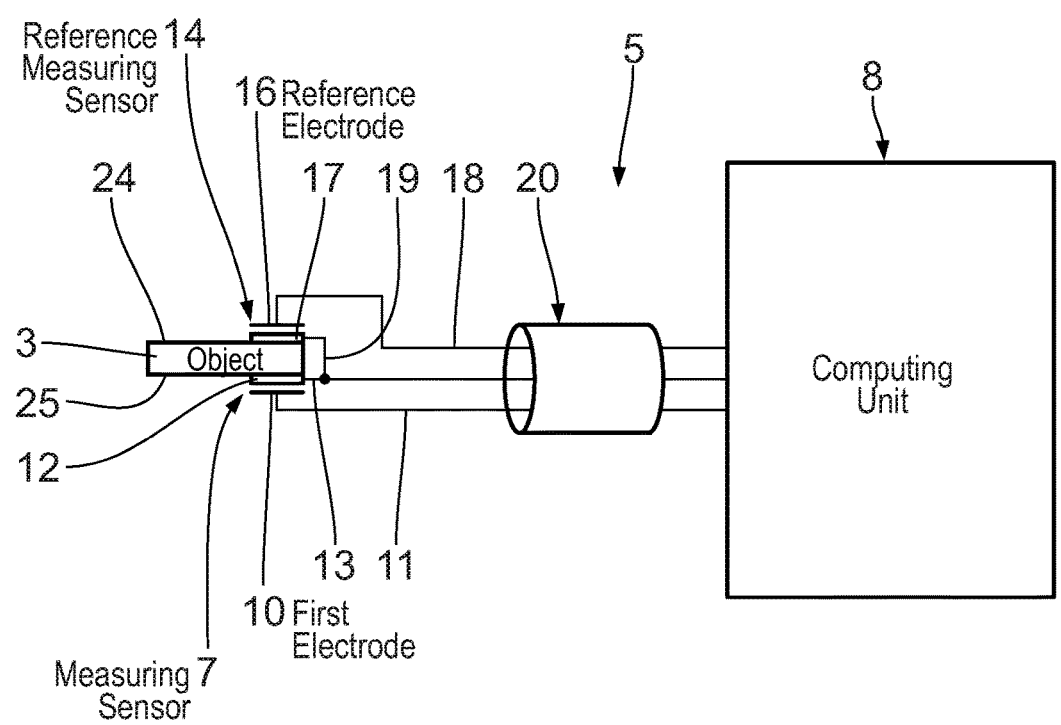
FIG. 6 shows a schematic illustration of a position measuring device in accordance with a fourth exemplary embodiment, in which the at least one reference measuring sensor is used as additional position measuring sensor or as difference measuring sensor.

FIG. 6 shows a fourth exemplary embodiment of the position measuring device 5 according to the invention. In contrast to the preceding exemplary embodiments, in which the reference measuring sensor 14 was operated as a passive sensor with a constant reference distance $D_R$, the reference sensor 14 is operated as active sensor or difference sensor. Thus, the reference measuring sensor 14 is arranged in such a way that the reference measurement signal $R_M$ or the reference signal R changes depending on the position x of the object 3 to be measured. To this end, the reference measuring sensor 14 is arranged on a side of the object 3 to be measured lying opposite the position measuring sensor 7. The second reference electrode 17 is arranged on the outer side 24 of the object 3 to be measured, whereas the second electrode 12 is arranged on the outer side 25. The second electrodes 12, 17 are embodied as measuring surfaces, which are produced by a coating. In respect of the second electrode 12, the first electrode 10 has a mean distance or a mean position $D_M$, which corresponds to a mean reference distance $D_R$. As a result of this arrangement, the sum of the distances $D_M$ and $D_R$ is constant and substantially corresponds to twice the distance $D_M$ or $D_R$. Since the sum of the position signal P and the reference signal R must be constant on account of this arrangement, the interference signal S may be determined and eliminated therefrom. As a result of this, in particular, interfering influences as a consequence of the ambient conditions and interfering influences as a consequence of the signal lines 11, 13, 18, 19 and of the measurement electronics 8a may be detected and compensated. Reference is made to the preceding exemplary embodiments in respect of the further design and the further functionality.

The features of the position measuring device 5 according to the invention, in particular of individual exemplary embodiments, may be combined with one another as desired in order to compensate interfering influences using at least one reference measuring sensor 14. In particular, the position measuring device 5 according to the invention allows compensation of interfering influences of signal cables, for example as a result of bending or the routing, ambient influences, such as e.g. temperature, humidity, and/or pressure, interfering influences as a consequence of drift and noise in the measurement electronics 8a, common mode interferences, drift as a result of changes in the position measuring sensor 7 over the service life thereof, and/or interfering influences as a consequence of heating of the measurement electronics 8a. As a result of this, the position measuring device 5 according to the invention becomes more robust in relation to interference influences and has a higher accuracy when ascertaining the position. In particular, the position measuring device 5 may be used immediately after switching on. Preferably, the at least one reference measuring sensor 14 corresponds to the associated position measuring sensor 7 in terms of design and installation. In particular the measurement electronics 8a, the wiring, plugs, the installation, embodiment and the design of the measuring sensors 7, 14 should be selected appropriately. The compensation of the interfering influences or the calculation of the position signal P may be carried out in real time or at discrete time intervals.

In the signal processing 8b, the calculated position signal P is compared to an intended position. From the system deviation, a position controller implemented in the signal processing 8b produces an actuating signal U, with which the associated actuator 4 is actuated in order to adapt the position x of the object 3 to be measured to the desired intended position. In order to obtain the desired positioning accuracy in the nanometer range or sub-nanometer range, the actuator 4 must facilitate a corresponding positioning accuracy. In particular, the positioning accuracy of the actuator 4 is at least 1.0 nm, in particular at least 0.5 nm, and in particular at least 0.1 nm. A corresponding statement applies to the measurement accuracy of the position measuring device 5. The capacitive position measuring sensor 7 may directly measure the position of the object 3 to be measured or indirectly measure a position in the kinematics of the associated actuator 4, which equally facilitates ascertaining the position of the object 3 to be measured.

Various exemplary embodiments of the at least one capacitive position measuring sensor 7 and/or of the at least one capacitive reference measuring sensor 14 are described in detail below. Since the following explanations apply equally to the position measuring sensor 7 and the reference measuring sensor 14, the various exemplary embodiments are explained in general on the basis of a capacitive measuring sensor 7, 14. Moreover, the measurement electronics 8a, which provide the respective measurement signal $P_M$ or $R_M$ to the signal processing 8b, are considered to be part of the measuring sensor 7, 14.

Figure 7:
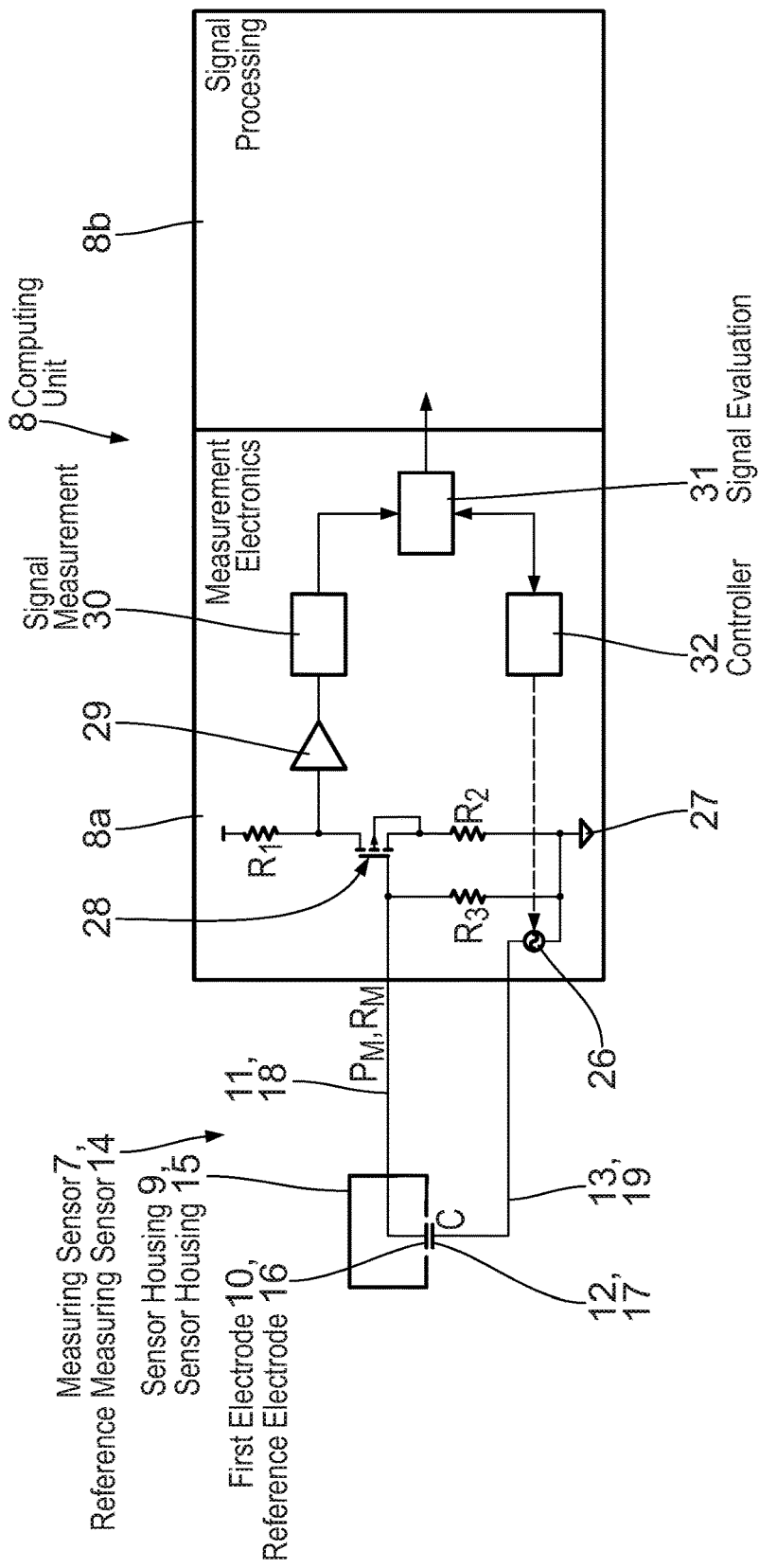
FIG. 7 shows a schematic illustration of the design of a conventional capacitive measuring sensor.

FIG. 7 shows the basic design of the capacitive measuring sensor 7, 14, as is conventional. On account of a limited installation space and in order to avoid unwanted heat influx, the measurement electronics 8a are arranged spatially distant from the measuring sensor housing 9, 15 and the first electrode 10, 16 included therein, and the second electrode 12, 17. To this end, the first electrode 10, 16 is linked to the measurement electronics 8a by way of the signal line referred to as measurement line 11, 18 below and the second electrode 12, 17 is connected to the measurement electronics 8a by way of the signal line referred to as supply line 13, 19 below. The supply line 13, 19 is connected to a reference potential 27 by way of an AC voltage source 26. The AC voltage source 26 produces a measurement signal dependent on a capacitance C of the measuring sensor 7, 14, said measurement signal being transmitted to the measurement electronics 8a via the measurement line 11, 18. The measurement signal is pre-amplified through a transistor 28 and amplified further and prepared with an amplifier circuit 29. A working point of the transistor 28 is set by way of ohmic resistors $R_1$ and $R_2$. An ohmic resistor $R_3$ connects the transistor 28 to the reference potential 27 on the input side. Disposed downstream of the amplifier circuit 29 are a signal measurement 30 and a signal evaluation 31, which ascertain relevant measured variables from the amplified measurement signal, for example the capacitance C and the associated position or the associated distance x of the electrodes 10, 12 or 16, 17. The ascertained measurement variables are supplied to the signal processing 8b, which uses these e.g. for position control. The signal evaluation 31 is signal connected to a controller 32, which controls the AC voltage source 26 or the excitation signal. The measurement electronics 8a may have an analog and/or digital embodiment, depending on requirements. Accordingly, the signal processing 8b may have an analog and/or digital embodiment, depending on requirements.

Figure 8:
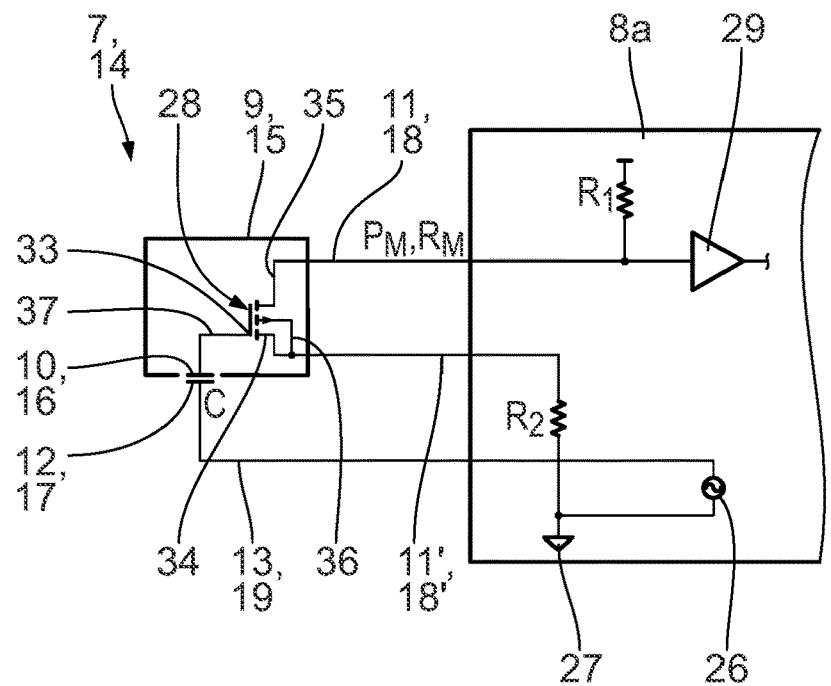
FIG. 8 shows a schematic illustration of the design of a capacitive measuring sensor in accordance with a first exemplary embodiment.

FIG. 8 shows a first exemplary embodiment of the capacitive measuring sensor 7, 14 according to the invention. According to the invention, the transistor 28 for amplifying or pre-amplifying the measurement signal is arranged in the measuring sensor housing 9, 15 in the vicinity of the first electrode 10, 16. Thus, the transistor 28 is integrated into the measuring sensor housing 9, 15. The transistor 28 is embodied as a field effect transistor and comprises a gate terminal 33, a source terminal 34, a drain terminal 35 and a bulk terminal 36. The gate terminal 33 is connected to the first electrode 10, 16 via a connecting line 37. The connecting line 37 is arranged in the measuring sensor housing 9, 15 and has a length of less than 100 mm, in particular of less than 10 mm, and in particular of less than 1 mm. The drain terminal 35 is connected to the measurement electronics 8a and the amplifier circuit 29 embodied therein by way of the measurement line 11, 18. The source terminal 34 is short-circuited with the bulk terminal 36 in the measuring sensor housing 9, 15 and connected to the measurement electronics 8a by way of a further measurement line 11', 18'. In the measurement electronics 8a, the measurement line 11', 18' is connected to the reference potential 27 via the ohmic resistor $R_2$. In accordance with the preceding exemplary embodiment, the ohmic resistors $R_1$ and $R_2$ define the working point of the transistor 28, which is now arranged in the measuring sensor housing 9, 15. In accordance with the preceding exemplary embodiment, the second electrode 12, 17 is connected to the AC voltage source 26 and the reference potential 27 via the supply line 13, 19. The transistor 28 already pre-amplifies the measurement signal belonging to the connection line 37 in the measuring sensor housing 9, 15, i.e. in the vicinity of the first electrode 10, 16, such that the measurement signal $P_M$, $R_M$, which is transmitted via the measurement line 11, 18, is amplified multiple times in comparison with the exemplary embodiment in accordance with FIG. 7. In particular, the measurement signal $P_M$, $R_M$ is amplified at least by a factor of 10, in particular at least by a factor of 20, and in particular at least by a factor of 50. As a result of this, interfering influences, which are coupled into the measurement signal $P_M$, $R_M$ as interference signal S, for example by way of the measurement line 11, 18, are substantially less pronounced. Expressed differently, the signal-to-noise ratio is improved by the aforementioned factor. The measurement accuracy is improved by the improved signal-to-noise ratio, which may be used for more accurate position measurement or position ascertainment and/or for reduction in the technical requirements on the signal cable 20 and/or the measurement electronics 8a. The signal lines 11, 11' and 13, and 18, 18' and 19, are preferably combined together in the signal cable 20.

The pre-amplified measurement signal $P_M$, $R_M$ is amplified again in the amplifier circuit 29 and compared in the signal evaluation 31 to the excitation signal from the AC voltage source 26, as a result of which the desired measured variables are established. Reference is made to the preceding exemplary embodiments in respect of the further design and the further functionality of the measuring sensor 7, 14 and the position measuring device 5.

Figure 9:
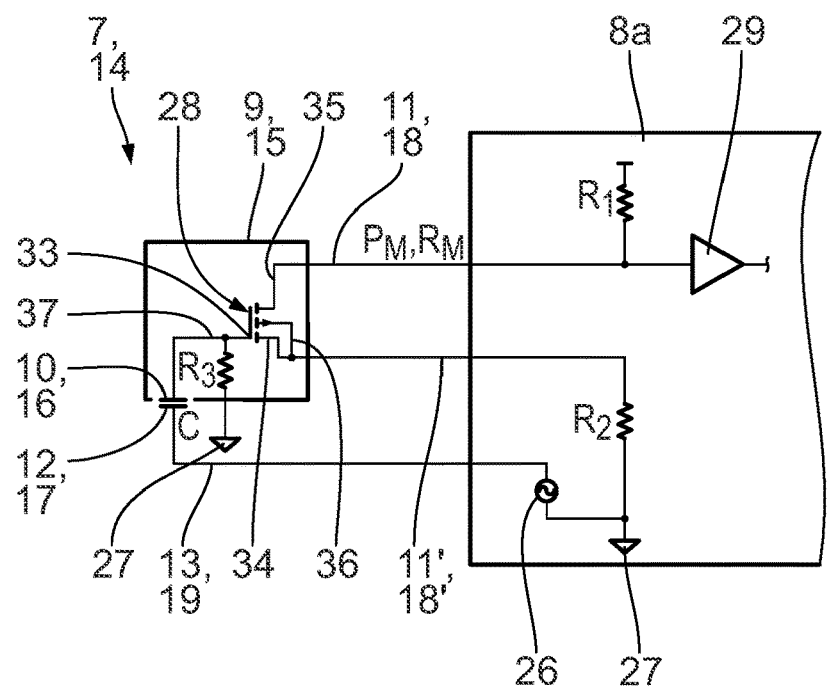
FIG. 9 shows a schematic illustration of the design of a capacitive measuring sensor in accordance with a second exemplary embodiment.

FIG. 9 shows a second exemplary embodiment of the capacitive measuring sensor 7, 14 according to the invention. In contrast to the preceding exemplary embodiment, the connecting line 37 is connected to the reference potential 27 via the ohmic resistor $R_3$. The ohmic resistor $R_3$ is arranged within the measuring sensor housing 9, 15. In principle, the reference potential 27 is an arbitrary, fixed and known potential within admissible limits. By way of example, the reference potential 27 is the ground potential. The potential in the connecting line 37 is defined by the ohmic resistor $R_3$. To this end, the resistor $R_3$ is selected to have high resistance and is, in particular, at least 10 k$\Omega$, in particular at least 100 k$\Omega$, and in particular at least 1000 k$\Omega$. The reference potential 27 needs to be available with sufficiently low interference in the direct vicinity of the measuring sensor housing 9, 15 such that no interference, which would render void the improved signal-to-noise ratio, is coupled in via the reference potential 27. By way of example, the ground potential may be selected as reference potential 27 by virtue of the ohmic resistor $R_3$ being connected to an electrically well conducting metal component. Reference is made to the preceding exemplary embodiments in respect of the further design and the further functionality of the measuring sensor 7, 14 and the position measuring device 5.

Figure 10:
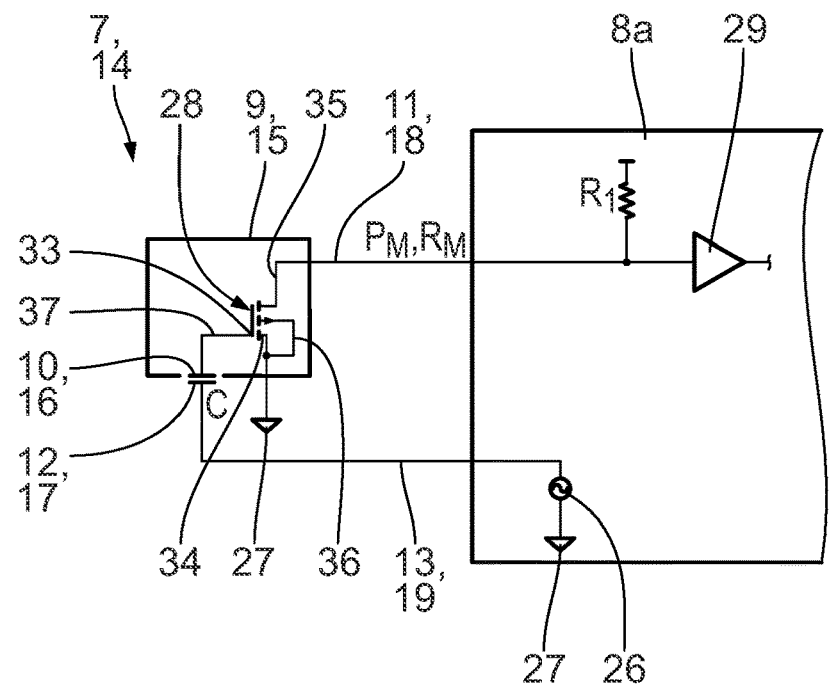
FIG. 10 shows a schematic illustration of the design of a capacitive measuring sensor in accordance with a third exemplary embodiment.

FIG. 10 shows a third exemplary embodiment of the capacitive measuring sensor 7, 14 according to the invention. In contrast to the preceding exemplary embodiments, the source terminal 34 is connected to the reference potential 27. As a result of this, the measurement lines 11' and 18' and the ohmic resistor $R_2$ may be dispensed with. Reference is made to the preceding exemplary embodiments in respect of the further design and the further functionality of the measuring sensor 7, 14 and the position measuring device 5.

Figure 11:
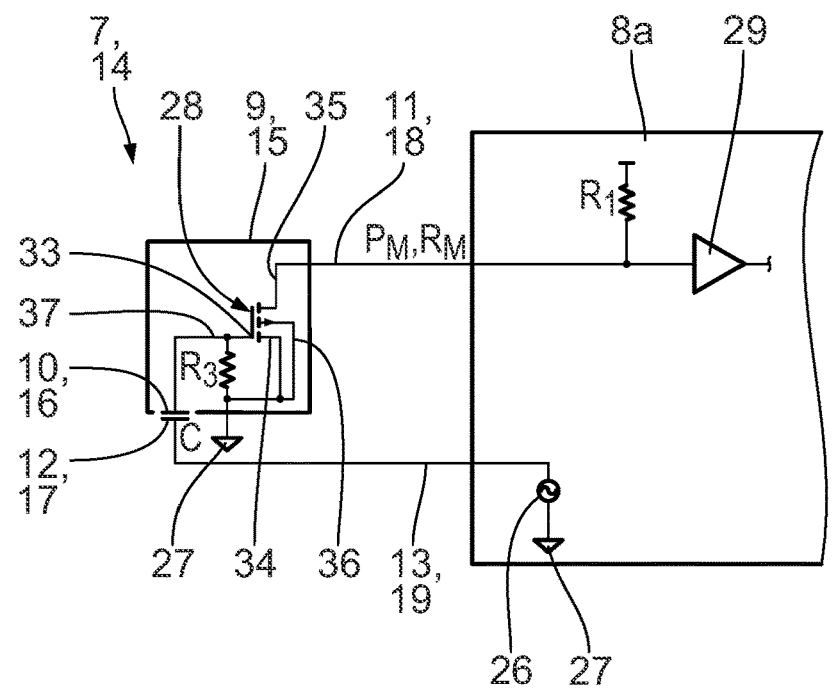
FIG. 11 shows a schematic illustration of the design of a capacitive measuring sensor in accordance with a fourth exemplary embodiment.

FIG. 11 shows a fourth exemplary embodiment of the capacitive measuring sensor 7, 14 according to the invention. In contrast to the preceding exemplary embodiments, the source terminal 34 and the ohmic resistor $R_3$ form a node which is connected to the reference potential 27. As a result of the connection to the reference potential 27, the measurement line 11', 18' and the ohmic resistor $R_2$ may be dispensed with. Moreover, the connecting line 37 has a defined potential. Reference is made to the preceding exemplary embodiments in respect of the further design and the further functionality of the measuring sensor 7, 14 and the position measuring device 5.

Figure 12:
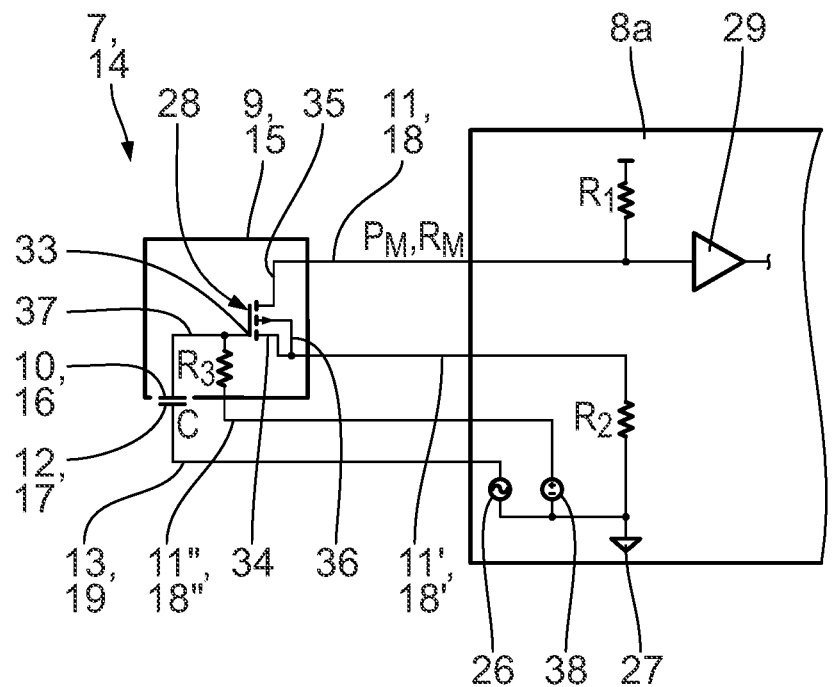
FIG. 12 shows a schematic illustration of the design of a capacitive measuring sensor in accordance with a fifth exemplary embodiment.

FIG. 12 shows a fifth exemplary embodiment of the capacitive measuring sensor 7, 14 according to the invention. In contrast to the preceding exemplary embodiments, the connecting line 37 is connected to the measurement electronics 8a via the ohmic resistor $R_3$ and a further signal line 11", 18". In the measurement electronics 8a, the signal line 11", 18" is connected to the reference potential 27 by way of a DC voltage source 38. The potential of the signal line 11", 18" is freely selectable by way of the DC voltage source 38, as a result of which the transistor 28 may be kept static in an operating state that is advantageous for the measurement. In particular, it is advantageous to statically overcome a threshold voltage of the transistor 28 in this manner. Reference is made to the preceding exemplary embodiments in respect of the further design and the further functionality of the measuring sensor 7, 14 and the position measuring device 5.

Figure 13:
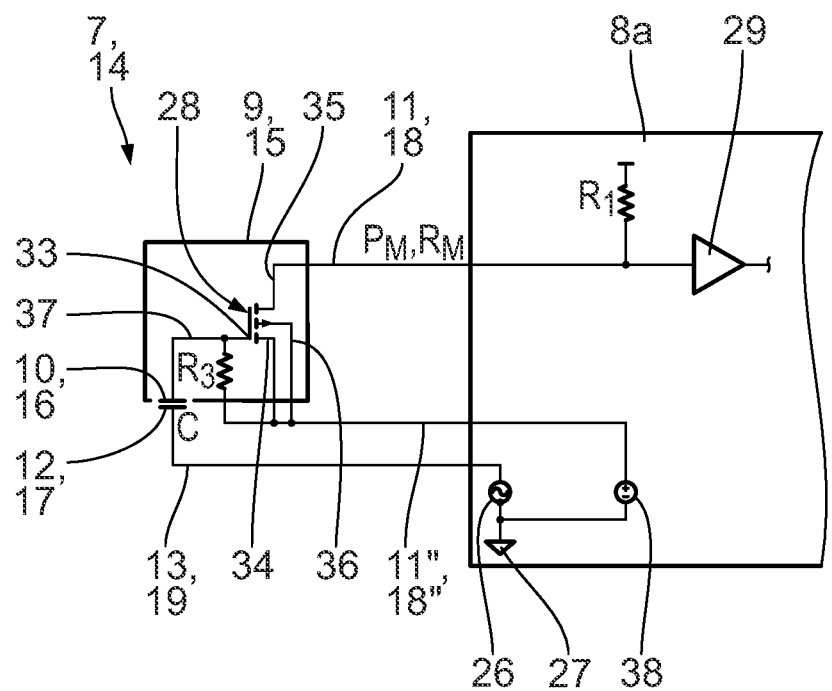
FIG. 13 shows a schematic illustration of the design of a capacitive measuring sensor in accordance with a sixth exemplary embodiment.

FIG. 13 shows a sixth exemplary embodiment of the capacitive measuring sensor 7, 14 according to the invention. In contrast to the preceding exemplary embodiment, the source terminal 34 and the ohmic resistor $R_3$ form a node which is connected to the reference potential 27 via the signal line 11", 18" and the DC voltage source 38. Reference is made to the preceding exemplary embodiments in respect of the further design and the further functionality of the measuring sensor 7, 14 and the position measuring device 5.

Figure 14:
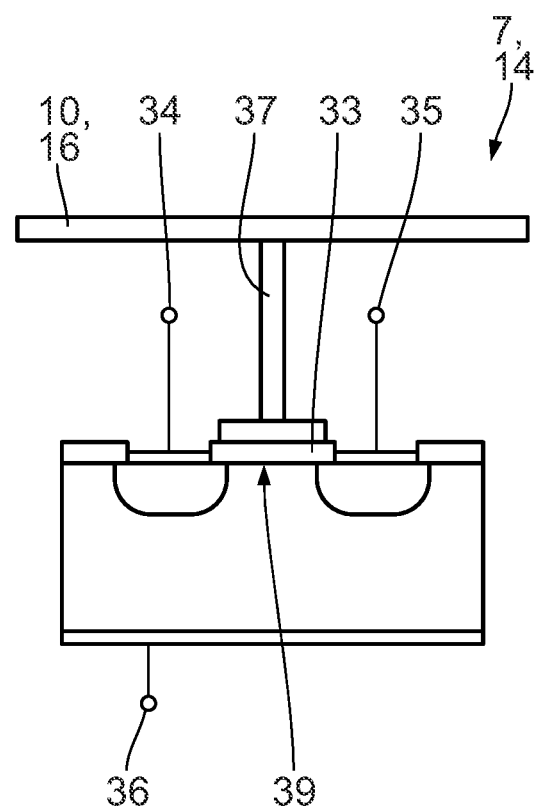
FIG. 14 shows a schematic illustration of the design of a capacitive measuring sensor in accordance with a seventh exemplary embodiment.

FIG. 14 shows a seventh exemplary embodiment of the capacitive measuring sensor 7, 14 according to the invention. In contrast to the preceding exemplary embodiments, in which the first electrode 10, 16 and the transistor 28 formed discrete components, the first electrode 10, 16 and the field effect transistor 28 are embodied as an integrated circuit. Thus, the first electrode 10, 16 and the field effect transistor 28 are implemented in an integrated circuit using methods of the microelectronics design. In the integration, use is made of the fact that the field effect transistor 28 itself already forms a capacitor, namely between the gate terminal 33 or the gate pole and the bulk terminal 36 or the bulk pole. In particular, this capacitor is formed by a channel 39, indicated in FIG. 14, below the gate terminal 33. Hence, the field effect transistor 28 should not be considered merely to be a pure signal amplifier but it is an integral component of the measuring sensor 7, 14 in this exemplary embodiment, since the electric field to be measured acts directly onto the channel 39 of the field effect transistor 28. What is advantageous, in particular, is that the potentially interference-sensitive connection line 37 between the first electrode 10, 16 and the gate terminal 33 has a very short embodiment and a length of less than 1 μm. Hence, the electric field to be measured is measured by the influence thereof on the amplification itself, which reduces the sensitivity to interference to a minimum. Additionally, the required installation space is substantially reduced since the first electrode 10, 16 and the field effect transistor 28 merge into one unit. In principle, the integration of the first electrode 10, 16 and of the field effect transistor 28 may be applied to each of the preceding exemplary embodiments. The respective circuit diagram is not changed thereby, only the layout or the integrated design differs from the discrete design. Reference is made to the preceding exemplary embodiments in respect of the further design and the further functionality of the measuring sensor 7, 14 and the position measuring device 5.

The capacitive measuring sensor 7, 14 according to the invention facilitates achieving a comparatively better compromise between the restricting influencing variables of installation space, development of heat and measurement accuracy to be achieved. By way of the capacitive measuring sensor 7, 14 according to the invention, it is possible to significantly increase the measurement accuracy, without the installation space, which is available as a rule, being adversely affected and/or the additional development of heat as a consequence of the transistor 28 being disadvantageous. The obtained measurement accuracy may selectively be used for simplifying the measurement electronics 8a and/or the signal cable 20. As a result of the transistor 28, the measurement signal is already amplified at the location where it arises, and so the amplified measurement signal $P_M$, $R_M$ is already transmitted to the measurement electronics 8a arranged spatially at a distance. As a result of this, there is a significant improvement in the signal-to-noise ratio.

As a matter of principle, the described capacitive measuring sensor 7, 14 is not restricted to measuring a position or a distance, but may also be used to measure other mechanical variables, such as e.g. fill levels and pressures.

In the described position measuring device 5 or in the positioning appliance 2, high accuracy when ascertaining the position is achieved by virtue of, firstly, a reference measuring sensor 14 being assigned to the at least one position measuring sensor 7 such that interference influences are eliminable from the position measurement signal $P_M$. Secondly, an increased accuracy when ascertaining the position is obtained by virtue of the transistor 28 being integrated into the respective measuring sensor housing 9, 15 such that the position measurement signal $P_M$ or the reference measurement signal $R_M$ is already amplified prior to transmission to the measurement electronics 8a, i.e. such that an improved signal-to-noise ratio is obtained. Both methods may find use in isolation or together. By way of example, the respective position measuring sensor 7 and the associated reference measuring sensor 14 may have a conventional design, as exemplified in FIG. 7. In this case, the increased accuracy is obtained only by eliminating the interference influences. Furthermore, no reference measuring sensor 14 may be assigned for example to the respective position measuring sensor 7, but the position measuring sensor 7 may be equipped with a transistor 28 integrated into the measuring sensor housing 9, as exemplified in FIGS. 8 to 14. In this case, the increased accuracy is obtained only by improving the signal-to-noise ratio. However, an ideal accuracy is obtained if both methods are combined with one another, i.e. if an associated reference measuring sensor 14 is assigned to the respective position measuring sensor 7 in order to eliminate interfering influences and both the respective position measuring sensor 7 and the associated reference measuring sensor 14 are embodied with a transistor 28 integrated into the respective measuring sensor housing 9, 15 in order to improve the signal-to-noise ratio.

What is claimed is:

1. A position measuring device, comprising:
   at least one capacitive position measuring sensor configured to provide a position measurement signal ($P_M$) relating to an object being measured,
   at least one capacitive reference measuring sensor configured to provide a reference measurement signal ($R_M$),
   a computing unit programmed to ascertain a position of the object being measured,
      said computing unit being connected to the at least one position measuring sensor and the at least one reference measuring sensor and
      said computing unit being embodied such that a position signal (P) is calculated for ascertaining the position from the position measurement signal ($P_M$) and from the reference measurement signal ($R_M$),
   wherein the at least one reference measuring sensor comprises a first reference electrode and a second reference electrode, said reference electrodes being arranged at a carrier body, wherein the carrier body consists of a material which has a coefficient of thermal expansion α at a temperature of 20° C., for which: $|\alpha| \leq 10 \cdot 10^{-8}/K$, and
   wherein the computing unit is connected to the position measuring sensor and the reference measuring sensor via signal lines which, at least in sections, form a signal cable.

2. The position measuring device as claimed in claim 1, wherein the signal lines form over 70% of a total length (L) of the signal cable.

3. The position measuring device as claimed in claim 1, wherein the position measuring device comprises plural position measuring sensors and plural reference measuring sensors, and
   wherein a respective one of the reference measuring sensors is assigned to a respective one of the position measuring sensors for calculating the position signal (P).

4. The position measuring device as claimed in claim 1, wherein the position measuring device comprises plural position measuring sensors, and wherein the reference measuring sensor is a common reference measuring sensor assigned to the plural position measuring sensors for calculating the position signal (P).

5. The position measuring device as claimed in claim 1, wherein the at least one reference measuring sensor is arranged at a distance (d) of at most 10 mm from an associated one of the at least one position measuring sensor.

6. The position measuring device as claimed in claim 1, wherein the first reference electrode and the second reference electrode are configured not to displace relative to one another.

7. The position measuring device as claimed in claim 1, wherein the reference electrodes define a reference distance $D_R$, wherein, for a ratio of a mean position $D_M$ of the object being measured to the reference distance $D_R$: $0.7 \leq D_M/D_R \leq 1.3$.

8. The position measuring device as claimed in claim 6, wherein, for the coefficient of thermal expansion α: $|\alpha| \leq 8 \cdot 10^{-8}/K$.

9. The position measuring device as claimed in claim 6, wherein the carrier body is configured as a hollow profile in cross section and the reference electrodes are arranged at opposite inner sides of the carrier body.

10. The position measuring device as claimed in claim 6, wherein the carrier body is arranged between the reference electrodes.

11. The position measuring device as claimed in claim 6, wherein the carrier body is formed by the object being measured.

12. The position measuring device as claimed in claim 1, wherein the at least one reference measuring sensor is arranged such that the reference measurement signal ($R_M$) changes in accordance with the position of the object being measured.

13. The position measuring device as claimed in claim 1, wherein at least one of the capacitive measuring sensors comprises a signal amplification transistor integrated into a housing of the at least one capacitive measuring sensor.

14. The position measuring device as claimed in claim 1, wherein the at least one position measuring sensor and the at least one reference measuring sensor are of identical construction.

15. A positioning appliance comprising:
an object being measured to be positioned,
an actuator configured to position the object being measured,
a position measuring device as claimed in claim 1.

16. The positioning appliance as claimed in claim 15, wherein the computing unit is configured to actuate the actuator in accordance with the calculated position signal (P), wherein the actuator has, in particular, a positioning accuracy of at least 1.0 nm, in particular of at least 0.5 nm, and in particular of at least 0.1 nm.

17. The positioning appliance as claimed in claim 16, wherein the actuator has a positioning accuracy of at least 1.0 nm.

18. A positioning appliance comprising:
an object being measured to be positioned,
an actuator configured to position the object being measured,
a position measuring device configured to ascertain positions of the object being measured, comprising:
  at least one capacitive position measuring sensor configured to provide a position measurement signal ($P_M$) relating to the object being measured,
  at least one capacitive reference measuring sensor configured to provide a reference measurement signal ($R_M$),
  a computing unit programmed to ascertain positions of the object being measured,
    said computing unit being connected to the at least one position measuring sensor and the at least one reference measuring sensor and
    said computing unit being embodied such that a position signal (P) is calculated for ascertaining the positions from the position measurement signal ($P_M$) and the reference measurement signal ($R_M$),
wherein the at least one reference measuring sensor comprises a first reference electrode and a second reference electrode, said reference electrodes being arranged at a carrier body,
wherein the carrier body consists of a material which has a coefficient of thermal expansion α at a temperature of 20° C., for which: $|\alpha| \leq 10 \cdot 10^{-8}$/K, and
wherein at least one of the capacitive measuring sensors comprises a signal amplification transistor integrated into a housing of the at least one capacitive measuring sensor.

* * * * *